United States Patent Office 3,631,204
Patented Dec. 28, 1971

3,631,204
PREPARATION OF BENZOIC ACID
FROM TOLUENE
Clyde H. Bell, Chattanooga, Tenn., assignor to Velsicol
Chemical Corporation, Chattanooga, Tenn.
No Drawing. Filed Apr. 13, 1967, Ser. No. 630,494
Int. Cl. C07c 63/02
U.S. Cl. 260—524 R   10 Claims

ABSTRACT OF THE DISCLOSURE

An improvement in the process for the production of benzoic acid by the reaction of toluene and air in contact with a heavy metal oxidation catalyst which comprises performing the oxidation in a liquid system at a temperature of at least about 200° F. until the reaction mixture contains from about 40 to about 65 weight percent benzoic acid;
reducing the pressure on the reaction mixture to atmospheric while maintaining the reaction mixture in the liquid state;
maintaining the concentration of the benzoic acid in the reaction mixture to between about 25 and about 45 weight percent;
and further lowering the temperature of the reaction mixture to a temperature below about 100° F.

---

Benzoic acid produced from toluene by oxidation with an oxygen-containing gas, particularly air, is normally contaminated with various impurities and decomposition products consisting principally of non-acidic oxygenated compounds. These compounds may be derived from impurities in the toluene charged or from side or by-product reactions occurring during the oxidation reaction.

A process for producing benzoic acid from toluene by oxidation and further processing to substantially eliminate these impurities is described in U.S. Pat. 3,210,416 issued Oct. 5, 1965, to Fragen et al. The process described therein includes continuously contacting toluene, benzoic acid and catalyst with a gas containing free oxygen under oxidation conditions until the reaction mixture contains between about 15 and about 25% benzoic acid, distilling the reaction mixture to remove toluene until the mixture contains from about 40 to about 60% benzoic acid and cooling the mixture to about 120° F. to crystallize benzoic acid.

Although the process described in U.S. Pat. 3,210,416 seeks to eliminate impurities in the benzoic acid produced, it has several disadvantages which detract from its economic acceptance. For example, the process requires the distillation of the oxidation product containing 15–25% benzoic acid to a product containing 40–60% benzoic acid. This distillation step requires the removal of large quantities of toluene. In order to operate the process economically, the toluene from this distillation must be recycled back to the oxidation step. However, the amount of power in the form of heat required to accomplish the distillation step cannot be totally recovered even after heat exchange. Another disadvantage in performing the process as described in the patent involves the crystallization step. The patent teaches that the concentrate obtained from the distillation is cooled to a temperature between about 110° F. and about 130° F. The patent states that at this temperature a substantial quantity of benzoic acid is precipitated from the concentrate. However, operation of the crystallization step in this manner is inefficient in that large quantities of benzoic acid remain in the liquid concentrate. It is desirable to find a process which will produce benzoic acid of high purity while eliminating the disadvantages of the previously known processes.

Therefore, it is one object of the present invention to improve existing processes for producing benzoic acid.

It is another object of the present invention to provide an improved process for the preparation of benzoic acid from toluene by oxidation with air.

Another object is to provide an efficient process for the preparation of benzoic acid from toluene by oxidation with air wherein the benzoic acid is recovered directly from the oxidation reaction product.

Still another object of this invention is to provide an efficient process for the recovery of solid benzoic acid from a concentrated solution thereof.

These and other objects of the present invention will be readily apparent from the ensuing description.

It has now been found that existing processes for producing benzoic acid from toluene by oxidation with air can be greatly improved by oxidizing until the liquid reaction mixture contains from about 40% to about 65% by weight benzoic acid, reducing the pressure on the reaction mixture to atmospheric while maintaining the reaction system in the liquid state, maintaining the concentration of benzoic acid in the mixture at between about 25 and 45 weight percent and further reducing the temperature of the liquid mixture to below about 100° F.

In particular this involves an improvement in the process for the production of benzoic acid by the reaction of toluene and air in contact with a heavy metal oxidation catalyst which comprises performing the oxidation at a temperature of at least about 200° F. under superatmospheric pressure until the reaction mixture contains from about 40 to about 65 weight percent benzoic acid; reducing the pressure to atmospheric while maintaining the system in a liquid state preferably by lowering its temperature to below about 230° F.; making certain that the reaction mixture contains between about 25 and about 45 weight percent benzoic acid, usually requiring adding toluene to the mixture; and further lowering the temperature of the reaction mixture to a temperature below about 100° F.

The improvements defined above afford advantages not possible with the oxidation processes heretofore known, such as that described in U.S. Pat. No. 3,210,416. By oxidizing until the reaction mixture contains from about 40% to about 65% by weight benzoic acid, the distillation step necessary in previous processes prior to crystallization has been eliminated. Thus the present improved process eliminates the distillation and recovery of large quantities of toluene between the oxidation and crystallization steps with a saving of the power in the form of heat heretofore required in such a distillation. Contrary to the teaching in U.S. Pat. No. 3,210,416, it has now been found that in the present process oxidation to from about 40% to about 65% benzoic acid does not result in poorer quality benzoic acid or in increased amounts of intermediate oxidation products and by-products if the product is recovered as hereinafter described.

Moreover, the improved process of the present invention is substantially more efficient in obtaining benzoic acid than the previously known processes. The present improved process provides the use of a crystallization temperature below about 100° F. and preferably below about 90° F. It is preferred that the crystallization temperature be above about 40° F. At temperatures below 90° F. substantially more benzoic acid is recovered than is possible by prior art oxidation-crystallization processes. This efficiency in operation of the process of the present invention is not gained at the expense of purity of the product, since by recovery of the product as hereinafter described a product assaying above 99% benzoic acid can be obtained. In addition, a simple distillation of this product can be used to obtain a product having enhanced heat stability and assaying 99.9% or higher.

The oxidation step is performed by charging toluene and heavy metal oxidation catalyst into suitable oxidation apparatus wherein the toluene is intimately contacted with air and catalyst. The oxidation is performed at a temperature of above about 200° F. and a pressure of from about 30 to about 500 pounds per square inch. A temperature from about 250° F. to about 450° F. and a pressure of from about 50 to about 300 pounds per square inch is preferred. For optimum economy the oxidation is continued until the liquid reaction mixture, or product stream in a continuous process, contains from about 40% to about 65% by weight benzoic acid. The operating pressure can be maintained by charging the air under compression and/or by charging the toluene and catalyst feed stream under pressure.

The catalyst utilized in the oxidation step is a heavy metal oxidation catalyst in a form which is soluble in toluene. Heavy metal catalysts are preferred such as those of manganese, cobalt, nickel, chromium, vanadium, molybdenum, tungsten, tin, and mixture thereof. Mixed metal catalysts are most preferred, such as manganese bromide or acetate with ammonium molybdate, ammonium chromate, cobalt acetate, cobalt octoate, etc. A promoter such as bromine, particularly in the form of a bromate or bromide of a heavy metal described above can also be advantageously used. A catalytic amount of catalyst, such as of from about 0.01% to about 10% or more, and preferably from about 0.2% to about 2%, based on the weight of toluene charged to the oxidation reaction can be used to catalyze the reaction.

The pressure on the reaction mixture after the completion of the oxidation reaction is reduced to atmospheric while maintaining the system in a liquid state. This can be accomplished by lowering the temperature of the reaction mixture to below about 230° F. prior to lowering the pressure so as to prevent loss of product.

Thereafter the pressure is reduced to about atmospheric pressure. Toluene is added, if necessary, to maintain a benzoic acid concentration of from about 25 to about 45 weight percent. It is preferred that the benzoic acid content be from about 35 to about 45 weight percent. The reduction in temperature can be effected by cooling the pipes conducting the product stream with a suitable cooling fluid, by heat exchange with a charge stream, and the like; while the pressure reduction can be performed by passing the product stream through a back pressure regulator to prevent loss of pressure to the oxidation reaction. These and other means and the equipment to effect these operations are known to the art.

The product stream is then cooled to a temperature below about 100° F., normally to a temperature of from about 40° F. to about 100° F., and preferably to a temperature of from about 60° F. to about 90° F. The cooling can be conveniently carried out in suitable crystallization apparatus to precipitate most of the benzoic acid. In the preferred operation of the process of this invention the precipitated benzoic acid is maintained in the form of a slurry in the liquid portion of the product stream in the crystallization apparatus.

After crystallization the benzoic acid can be recovered from the product stream. The recovery can comprise separating the precipitated benzoic acid from the product stream, such as by filtration. The preferred method of separating the precipitated benzoic acid is by centrifuging, although other methods can be utilized. The separated benzoic acid can be purified by washing the recovered product with fresh toluene and again separating the precipitated benzoic acid. In this manner, a product assaying 94–96% benzoic acid can be obtained.

The benzoic acid product obtained often contains from 3 to 5% toluene, particularly where filtration or centrifugation is used to effect recovery of the benzoic acid. This residual toluene can be removed to further purify the benzoic acid product by melting the product and heating and drying the product under vacuum. The product thus obtained often assays greater than 99% benzoic acid.

The benzoic acid product obtained above can be further treated, if desired, to obtain benzoic acid assaying 99.9% or higher, and to improve the heat stability of the product. This treatment can be readily performed, for example, by a simple distillation. A distillation column, such as a column packed with ceramic distillation elements as is common to the art, can be used. A column having about five theoretical plates is sufficient for this purpose. The benzoic acid product thus obtained is relatively stable to prolonged periods at elevated temperatures. For example, the product when held at 302° F. for 24 hours does not darken appreciably, whereas the untreated benzoic acid darkens rapidly at this temperature.

Surprisingly, and contrary to what would be expected from the prior processes, operation according to the improved process of the present invention does not result in a greatly contaminated benzoic acid product. It has now been found that by operation of the process of the present invention, and recycling the liquid portion of the product stream after the crystallization step to the oxidation reactor, the concentration of impurities quickly reaches an equilibrium and little or no additional amounts of impurities are produced. Moreover, the impurities remain in the reaction system, i.e. remain in the toluene recycle and wash streams, and are not present in the product benzoic acid in more than negligible amounts.

Accordingly, the process of the present invention provides higher throughput than is possible with the prior process. Furthermore, it eliminates the need for the removal of toluene by distillation before the crystallization of the benzoic acid. Additional advantage can be obtained by utilizing an oxidation catalyst which is soluble in the recycle stream at the crystallization temperature, thereby permitting reuse of the catalyst over a number of cycles with the addition of fresh catalyst only to maintain the catalyst strength and concentration. An additional advantage is that the mother liquid obtained by removal of the product benzoic acid from the reaction mixture can be recycled for use in subsequent oxidation without detrimental effect on the process or on the purity or yield of product.

The process of the present invention and its advantages will be more clearly apparent from the following examples:

EXAMPLE 1

Toluene with cobalt octoate (about 1% by weight of the toluene) is charged to a pressure reactor. Air is continually fed to the reactor and intimately mixed with the toluene charge and the reactor is maintained at a pressure of about 150 pounds per square inch. The reactor is heated to and thereafter maintained at about 375° F. After the desired benzoic acid concentration (40–65%) is reached a product stream is continuously withdrawn, cooled to below 230° F., and the pressure is reduced to atmospheric. Continuous addition of fresh or recycle toluene to the reactor is begun to maintain a constant reactor composition. The product stream is diluted with toluene to obtain 25–40% benzoic acid and the slurry is cooled (40–90° F.) to precipitate the desired portion of benzoic acid. The benzoic acid is recovered and the mother liquor and wash liquors are used as reactor feed stock.

EXAMPLE 2

Toluene with cobalt octoate (about 1% by weight of the toluene) is charged to a pressure reactor. Air is continually fed to the reactor and intimately mixed with the toluene charge. The reactor is maintained at about 100 pounds per square inch and heated to about 375° F.

After the reaction mixture contained about 60% benzoic acid, it was continuously withdrawn, cooled to about 180° F. and the pressure reduced to about atmospheric. Continuous addition of toluene to the reactor was begun to hold the reactor benzoic acid concentration at about 60 weight percent. The product stream was diluted with toluene to obtain a solution containing about 40 weight percent benzoic acid and this was cooled to about 90°–100° F. yielding a slurry of precipitated benzoic acid in toluene. The slurry was centrifuged for 30 seconds. The solid portion of the product stream was washed on the centrifuge with toluene amounting to .35 part by weight per part of benzoic acid and then centrifuged for 120 seconds. The solid portion after centrifuging assayed greater than 94% benzoic acid. This product was dried under vacuum to remove about 4% toluene yielding benzoic acid assaying about 98.5%. The toluene recovered from the centrifuge was combined with fresh toluene and used for the dilution step. After two effective cycles the product stream was checked and found to contain 6.5% impurities.

EXAMPLE 3

The continuous process described in Example 2 was performed for 14 effective cycles, i.e. the recycle toluene described above, was used as the reactor charge and diluent for 13 consecutive passes after the initial pass. The product stream was analyzed after the 6th and 14th cycles and was found to contain 7.0% and 7.2% impurities respectively. A portion of the product stream after the 14th pass was centrifuged and washed as in Example 2. The product obtained was vacuum dried to remove 3–5% residual toluene yielding benzoic acid assaying about 98.5%.

EXAMPLE 4

The process described in Examples 2 and 3 was repeated, except that the product stream was continuously withdrawn from the reactor when the reaction mixture contained about 40% benzoic acid, and the subsequent dilution with toluene was omitted. After centrifugation of the cooled reaction slurry, the resulting product was found to contain more than 94% benzoic acid, and after washing on the centrifuge with about .35 its weight of toluene, centrifugation, and vacuum drying, assayed greater than 99% benzoic acid. After the 6th cycle, the product stream from the reactor was found to contain 5.8% impurities.

EXAMPLE 5

Example 4 was repeated, except that the solid product after the initial centrifugation was washed with 0.70 part toluene per part benzoic acid, and the centrifugation was continued for an additional 300 seconds rather than for 120 seconds. The resulting product was heated under vacuum to remove about 2% residual toluene. The product obtained assayed greater than 99.5% benzoic acid.

EXAMPLE 6

A portion of the product of each of Examples 4 and 5 was distilled in a glass column having less than 5 theoretical plates at a reflux ratio of 1:1. Ninety percent of the charged material was taken overhead in each case. The recovered overhead from the product of Example 4 assayed 99.8% benzoic acid and the recovered overhead from the product of Example 5 assayed greater than 99.9% benzoic acid while the pot residues assayed 96% and 98.5% benzoic acid, respectively. The two colorless overhead products were heated at 302° F. for 24 hours yielding a product having an APHA color of 90 in the case of Example 4 and 40 in the case of Example 5.

I claim:
1. An improvement in the process for the production of benzoic acid by the reaction of toluene and air in contact with a heavy metal oxidation catalyst which comprises
performing the oxidation in a liquid system at a temperature of at least about 200° F. until the reaction mixture contains from about 40 to about 65 weight percent benzoic acid;
reducing the pressure on the reaction mixture to atmospheric while maintaining the reaction mixture in the liquid state;
maintaining the concentration of the benzoic acid in the reaction mixture to between about 25 and about 45 weight percent;
and further lowering the temperature of the reaction mixture to a temperature below about 100° F.
2. The process of claim 1 wherein the reaction mixture is maintained under the minimum superatmospheric pressure to maintain it as a liquid during the oxidation reaction.
3. The process of claim 1 wherein the oxidation reaction is performed at a maximum temperature of about 450° F.
4. The process of claim 1 wherein the temperature of the reaction mixture subsequent to the completion of the oxidation reaction is lowered to below about 230° F.
5. The process of claim 1 wherein the concentration of benzoic acid in the reaction mixture after the pressure has been reduced to atmospheric is adjusted by adding toluene.
6. The process of claim 5 wherein adding the toluene dilutes the concentration of benzoic acid to between about 35 and about 45 weight percent.
7. The process of claim 4 wherein the temperature of the system in the last step is lowered to below about 90° F.
8. The process of claim 7 wherein the temperature of the system after the last step is above about 40° F.
9. The process of claim 1 wherein the benzoic acid product is recovered by centrifuging the reaction mixture after it has been cooled to a temperature below about 100° F.
10. The process of claim 1 wherein mother liquor is recycled into the reaction system prior to the oxidation reaction.

References Cited

UNITED STATES PATENTS 3,163,671   12/1964   Fragen et al. _____ 260—524
3,210,416   10/1965   Fragen et al. _____ 260—524

LEWIS GOTTS, Primary Examiner

R. WEISSBERG, Assistant Examiner